(12) United States Patent
Masuda et al.

(10) Patent No.: US 9,341,484 B2
(45) Date of Patent: May 17, 2016

(54) NAVIGATION SERVER AND NAVIGATION SYSTEM (71) Applicant: HONDA MOTOR CO., LTD., Tokyo (JP)

(72) Inventors: Takurou Masuda, Tokyo (JP); Tadafumi Nogawa, Tokyo (JP); Aiko Ishii, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 14/372,585

(22) PCT Filed: Oct. 19, 2012

(86) PCT No.: PCT/JP2012/077125
§ 371 (c)(1),
(2) Date: Jul. 16, 2014

(87) PCT Pub. No.: WO2013/118350
PCT Pub. Date: Aug. 15, 2013

(65) Prior Publication Data
US 2014/0372035 A1 Dec. 18, 2014

(30) Foreign Application Priority Data
Feb. 6, 2012 (JP) ................................ 2012-023485

(51) Int. Cl.
G01C 21/34 (2006.01)
G01C 21/20 (2006.01)

(52) U.S. Cl.
CPC ............ *G01C 21/20* (2013.01); *G01C 21/3415* (2013.01)

(58) Field of Classification Search
CPC ........................... G01C 21/3691; B60W 40/04
USPC .................................................. 701/537, 522
See application file for complete search history.

(56) References Cited

U.S. PATENT DOCUMENTS

2003/0060974 A1* 3/2003 Miyahara et al. ............. 701/209
2013/0006508 A1* 1/2013 Li et al. ......................... 701/117

FOREIGN PATENT DOCUMENTS

JP 2001-141482 A 5/2001
JP 2002-156236 A 5/2002
(Continued)

OTHER PUBLICATIONS

International Search Report dated Nov. 13, 2012 corresponding to International Patent Application No. PCT/JP2012/077125 and English translation thereof.

*Primary Examiner* — Luke Huynh
(74) *Attorney, Agent, or Firm* — Squire Patton Boggs (US) LLP (57) ABSTRACT

Provided is a navigation server which informs a user of the meaning of the search result of a route considering a primary event through a navigation client. According to a navigation server 100, it is recognized whether a first index value $e_1$ indicating the degree of influence of a predetermined primary event on the passage along a searched route connecting a present location $p_1$ and a destination point $p_2$ is greater than a first threshold value $\epsilon_1$. When the first index value $e_1$ of the previous searched route $R_1$ is greater than the first threshold value $\epsilon_1$, a route $R_2$ is re-searched to reduce the first index value $e_1$. When the first index value $e_1$ of the search route $R_1$ or $R_2$ is the first threshold value $\epsilon_1$ or less, "confirmation information" indicating as such and the searched route are transmitted to the navigation client 200 and recognized.

5 Claims, 5 Drawing Sheets (56) References Cited

FOREIGN PATENT DOCUMENTS

| JP | 2002-323336 A | 11/2002 |
| JP | 2003-329472 A | 11/2003 |
| JP | 2005-345152 A | 12/2005 |
| JP | 4262931 B2 | 5/2009 |
| JP | 2009-192356 A | 8/2009 |
| JP | 2010-032543 A | 2/2010 |
| JP | 2010-197261 A | 9/2010 |

* cited by examiner

MESH

FIG.3B

DESIGNATED MESH

FIG.3 C

DESIGNATED MESH

FIG.3 D

DESIGNATED MESH

FIG.4

FIG.5

NAVIGATION SERVER AND NAVIGATION SYSTEM

TECHNICAL FIELD

The present invention relates to a navigation technique.

BACKGROUND ART

A technical method has been proposed which enables a navigation client provided in a given vehicle to use information required for the vehicle among measured values of local weather information or disaster information that is collected from the navigation clients provided in each vehicle by a navigation server (see Patent Document 1). Here, "navi" is the abbreviation of "navigation".

PRIOR ART DOCUMENTS

Patent Document

Patent Document 1: Japanese Patent No. 4262931

SUMMARY OF THE INVENTION

Problem to be Solved by the Invention

However, the crew of the vehicle (the user of the navigation client) does not clearly know how a primary event, such as abnormal weather, is reflected in the search result of the route by the navigation server.

An object of the invention is to provide, a navigation server which can inform the user of the meaning of the search result of a route considering the primary event through a navigation client.

Means for Solving Problem

According to the invention, there is provided a navigation server that is configured to support a guidance of a user by a navigation client based on communication with the navigation client. The navigation server includes a first server arithmetic processing element and a second server arithmetic processing element that are formed by a programmable computer. The first server arithmetic processing element is configured to search for a route connecting a present location of the user and a destination point. The second server arithmetic processing element is configured to determine whether a first index value indicating a degree of influence of a pre-determined primary event on a passage of the user along the searched route is greater than a first threshold value. When the second server arithmetic processing element determines that the first index value of a previous searched route is greater than the first threshold value, the first server arithmetic processing element re-searches a route such that the first index value is reduced. When determining that the first index value of a latest searched route is equal to or less than the first threshold value, the second server arithmetic processing element is configured to make the navigation client recognize the latest searched route and confirmation information indicating that the first index value is equal to or less than the first threshold value based on the communication with the navigation client.

A navigation system according to the present invention includes the navigation server and the navigation client.

According to the navigation server and the navigation system of the present invention, it is possible to inform the user of the navigation client of the latest searched route and that the degree of influence of the predetermined primary event on the passage of the vehicle along the latest route is low.

The "recognition" of information by a component according to the present invention means that the component performs all information processing for preparing information in order to process other information. For example, the "recognition" includes the following: receiving information; searching for or reading data from a database or a memory; performing a designated arithmetic process on the received or detected base information to calculate, measure, estimate, set, determine, search for, and predict information; decoding received packets to actualize information; and storing the calculated information in the memory, or the like.

In the navigation server according to the present invention, the second server arithmetic processing element may be configured to make the navigation client recognize an example of a secondary event which is caused by an occurrence of the primary event and the route which is re-searched such that the first index value is equal to or less than the first threshold value, based on the communication with the navigation client.

According to the navigation server having the above-mentioned structure, it is possible to make the user of the navigation client recognize that the latest route is searched in order to avoid a situation of being involved in the example of the secondary event.

In the navigation server according to the present invention, the second server arithmetic processing element may be configured to make the navigation client recognize costs of the previous searched route and the re-searched route or a deviation of the costs and the route which is re-searched such that the first index value is equal to or less than the first threshold value, based on the communication with the navigation client.

According to the navigation server having the above-mentioned structure, it is possible to make the user of the navigation client recognize the costs (load required for movement) of the latest searched route and the previous searched route or the deviation thereof.

In the navigation server according to the present invention, in a case the second server arithmetic processing element determines that the first index value of the re-searched route is greater than the first threshold value, the second server arithmetic processing element may further determine whether a second index value indicating a degree of influence of the primary event on the passage of the user at the present location is greater than a second threshold value. In a case the second index value is determined to be equal to or less than the second threshold value, the second server arithmetic processing element may make the navigation client recognize the re-searched route and first attention attraction information indicating that the passage of the user is likely to be affected by the primary event, based on the communication with the navigation client. In a case it is determined that the second index value is greater than the second threshold value, the second server arithmetic processing element may make the navigation client recognize the re-searched route and second attention attraction information indicating that the current passage of the user is affected by the primary event based on the communication with the navigation client.

According to the navigation server having the above-mentioned structure, it is possible to inform the user whether the user of the navigation client is currently affected by the primary event or the user is likely to be affected in the future by the primary event when moving along the re-searched route.

DESCRIPTION OF THE PREFERRED EMBODIMENTS (Configuration of Navigation System)

Figure 1:
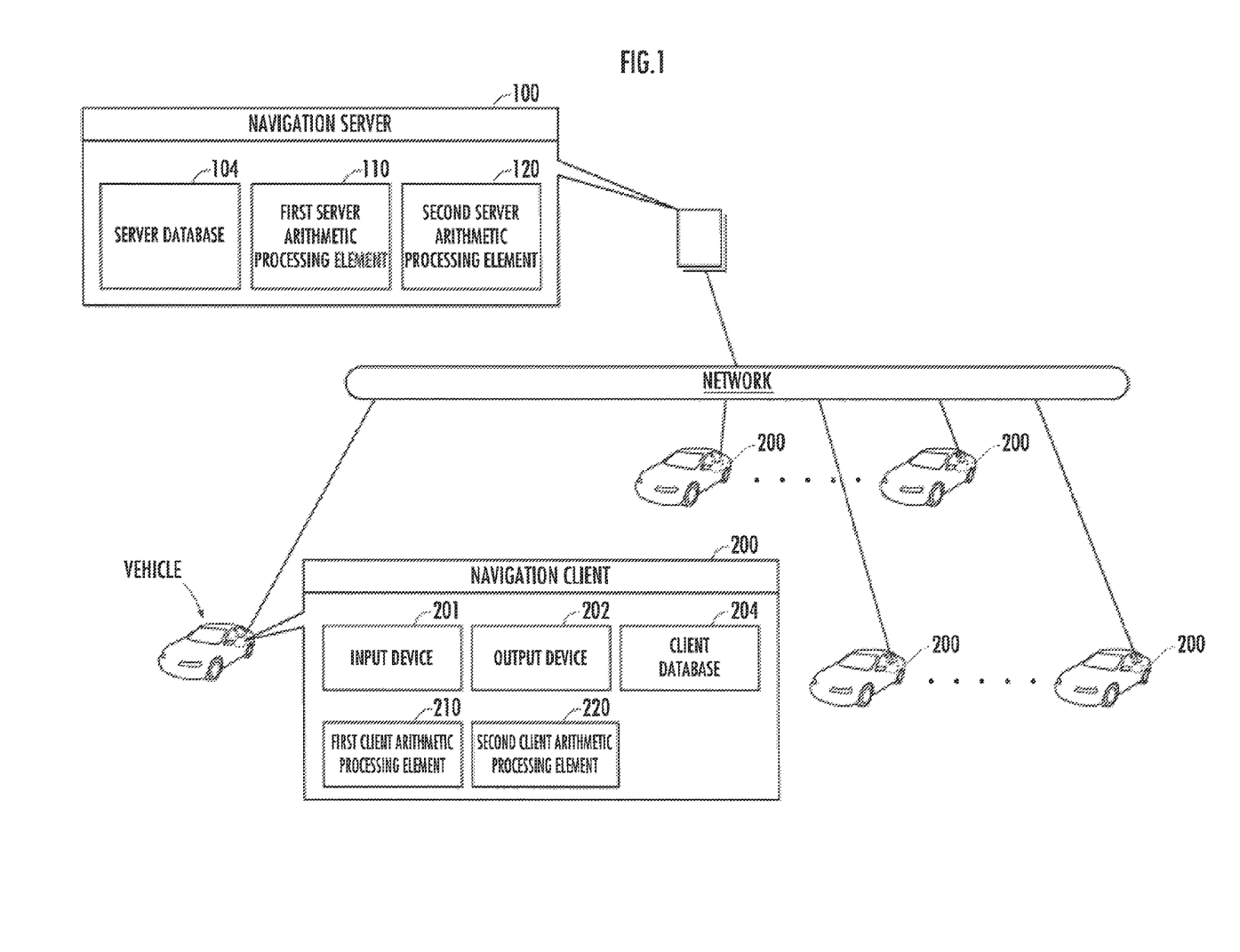
FIG. 1 is a diagram illustrating the configuration of a navigation server and a navigation system according to the present invention.

A navigation system shown in FIG. 1 includes a navigation server 100 and navigation clients 200. At least some of a plurality of navigation clients 200 may temporarily or constantly function as the navigation server 100.

The navigation server 100 includes a server database 104, a first server arithmetic processing element 110, and a second server arithmetic processing element 120. The navigation server 100 may be configured by one server computer or a plurality of server computers. For example, the Internet, a telephone network, a communication network using satellite broadcasting, or a terrestrial network (using, for example, a medium wave, a short wave, or an ultra-short wave) is used as a communication network.

The server database 104 stores a "server map". The server map defines an arrangement aspect of a plurality of links, an arrangement aspect of a plurality of meshes, a first cost which is defined by factors except for a primary event in each of the plurality of links, a designated mesh in which the primary event is occurring among the plurality of meshes, and an event cost which results from the primary event in each of the plurality of meshes.

The "arrangement aspect of links" is defined by a group of coordinate values (latitude and longitude) indicating both end points of each link and a plurality of discrete or quasi-continuous points between both end points. Some or all of the links may be defined so as to be associated with, for example, link identifiers for identifying the links or the type of roads formed by the links.

The "arrangement aspect of meshes" is defined by a group of coordinate values indicating a plurality of discrete or quasi-continuous points on the boundary line thereof. Some or all of the meshes (including the designated mesh) may be defined so as to be associated with, for example, mesh identifiers for identifying the meshes or the attributes of areas corresponding to the meshes. Since the mesh is defined by the coordinate values, versatility for all of target navigation clients 200 is ensured regardless of the creator of a client map used in the navigation client 200 or a difference in the definition of the mesh corresponding to a difference in version.

For example, the mesh has a rectangular shape as shown in FIGS. 3A to 3D. However, the mesh may have any shape which can cover all of target areas which are adjacent to each other, but do not overlap each other. For example, the shape of the mesh may be a regular triangle or a regular hexagon. The meshes may have different shapes and/or sizes.

The "first cost" may be a cost in which factors except for the primary event are reflected, that is, a cost in which the influence of the primary event is not reflected. The factors except for the primary event include, for example, a travel distance, the time required for movement (predicted value), a toll, and fuel consumption (predicted value). The high/low of the cost varies depending on some or all of the factors.

For example, among the lengths of each link which are defined by the server map, as the sum of the lengths of each of the links forming a route increases, the first cost of the route is evaluated high. In addition, the time required for the vehicle to travel along the route may be predicted on the basis of road traffic information. As the time required for movement increases, the first cost of the route may be evaluated high. The road traffic information which is updated in real time by a predetermined road traffic information agency and is transmitted to the navigation server 100 is used to predict the time required for movement.

As the fuel consumption of the vehicle when the vehicle travels along the route increases, the first cost of the route may increase. For example, the inclined state of the link or the surrounding environment of the link may be one of fuel consumption estimation factors, depending on the type of the links forming the route (for example, an expressway, a principal road, and other roads). The factors may form a portion of the server map. For example, the cost is defined so as to decrease in the order of "expressway→principal road→other roads", "free road→toll road", "downhill→flat→uphill", "plain→mountainous area", or "depopulated area→populated area".

The "primary event" means a natural phenomenon and a human-made disaster (disaster) which are likely to have an effect on the passage of the vehicle or the user along the road. For example, a computer in a weather information center in each area (administrative district) sequentially or periodically transmits, to the navigation server 100, real-time information for defining the primary event, such as snow, road surface freezing, a rainstorm, a landslide, and river flooding, and the area (mesh) in which the primary event occurs. Whenever the navigation server 100 receives the real-time information, the designation area and the event cost stored in the server database 104 are sequentially updated.

The "event cost" is defined such that, when the primary event occurs in an area corresponding to a given mesh, the event cost for the mesh is higher than that when the primary event does not occur. For example, when the primary event is "road surface freezing" and the road surface freezing occurs in an area corresponding to a given mesh, the event cost allocated to the mesh is higher than that when the road surface freezing does not occur.

When the primary events are the same type, but the degrees thereof (the degrees of influence on the passage of the vehicle) are defined to be different from each other, the event cost allocated to a given mesh increases as the degree of the primary event which occurs in the area corresponding to the mesh increases. For example, when the primary event is "snow", the event cost allocated to the mesh is higher as "the amount of snowfall" increases. The definition of the primary event in each area is not necessarily the same. When the primary event is "earthquake", the event cost allocated to the mesh increases as the energy of the earthquake is higher or seismic intensity is higher.

The server database 104 stores the product or sum of the first cost and the event cost as a "second cost". When the product is used as the second cost, the event cost of the mesh in which the primary event does not occur is defined as "1" and the event cost of the mesh in which the primary event occurs is defined as a value greater than 1. That is, as the degree of the primary event is larger, the event cost is defined as a larger value.

The server database 104 further stores an "example of the secondary event" which is caused by the occurrence of the primary event. For example, when the primary event is "heavy snow (heavy fall of snow)", an example of the secondary event indicating that "100 or more vehicles were confined for three days on the ○○ road on xx/xx/20xx due to heavy snow" or "three vehicle collision accidents continuously occurred in an ■■ area on ▲▲/▲▲/20xx due to heavy snow" is output.

Each of the first server arithmetic processing element 110 and the second server arithmetic processing element 120 is configured by a programmable computer and is configured so as to perform the following arithmetic process. The execution of information processing by a component according to the present invention means that the component is programmed so as to read a program from a memory and performs the information processing in charge on the basis of the program. The program is downloaded to the navigation server 100 through a network or it is installed in the navigation server 100 through a recording medium. Portions or all of the first server arithmetic processing element 110 and the second server arithmetic processing element 120 may be configured by physically independent hardware components.

The navigation client 200 includes an input device 201, an output device 202, a client database 204, a first client arithmetic processing element 210, and a second client arithmetic processing element 220. The navigation client 200 may be a portable apparatus or an apparatus which is constantly or temporarily provided in the vehicle.

The input device 201 is configured by a push-button-type interface or a touch-panel-type interface and enables the user to perform an information input operation, such as an operation of designating and inputting a destination point. The input device 201 may be configured of a microphone and a voice recognition device which analyzes a sound signal collected by the microphone and recognizes information indicating the utterance content of the user or an input.

The output device 202 is configured of an image output device including, for example, a liquid crystal panel on which the client map is displayed. When the input device 201 is configured of the touch-panel-type interface, touch buttons are displayed on the image output device. The output device 202 may be configured of a voice output device that outputs a voice signal related to image information displayed on the image output device, in addition to the image output device.

The client database 204 is configured so as to store the client map in which each point is described by the latitude and longitude. In the client map, a link connecting two separated points is described by a coordinate value group or a coordinate string indicating a plurality of points on the link. At least some of the links may be described so as to be associated with link identification information for identifying the links or the type of road formed by the links. The client map may be the same as the server map or it may be different from the server map in at least a portion of the format.

Each of the first client arithmetic processing element 210 and the second client arithmetic processing element 220 is configured by a programmable computer and is configured so as to perform an arithmetic process which will be described later. The program is downloaded to the navigation client 200 through the network or it is installed in the navigation client 200 through a recording medium. Portions or all of the first client arithmetic processing element 210 and the second client arithmetic processing element 220 may be configured by physically independent hardware components.

(Functions of Navigation System)

The functions of the navigation system having the above-mentioned configuration will be described.

In the navigation client 200, the first client arithmetic processing element 210 sequentially measures a present location $p_1$ of the navigation client 200 on the basis of, for example, a GPS signal received by a GPS receiver (not shown). When the user inputs a destination point $p_2$ to the navigation client 200 through the input device 201, the first client arithmetic processing element 210 transmits designated point information indicating the destination point $p_2$ and the present location $p_1$ of the vehicle (or the user) at that time to the navigation server 100.

Figure 2:
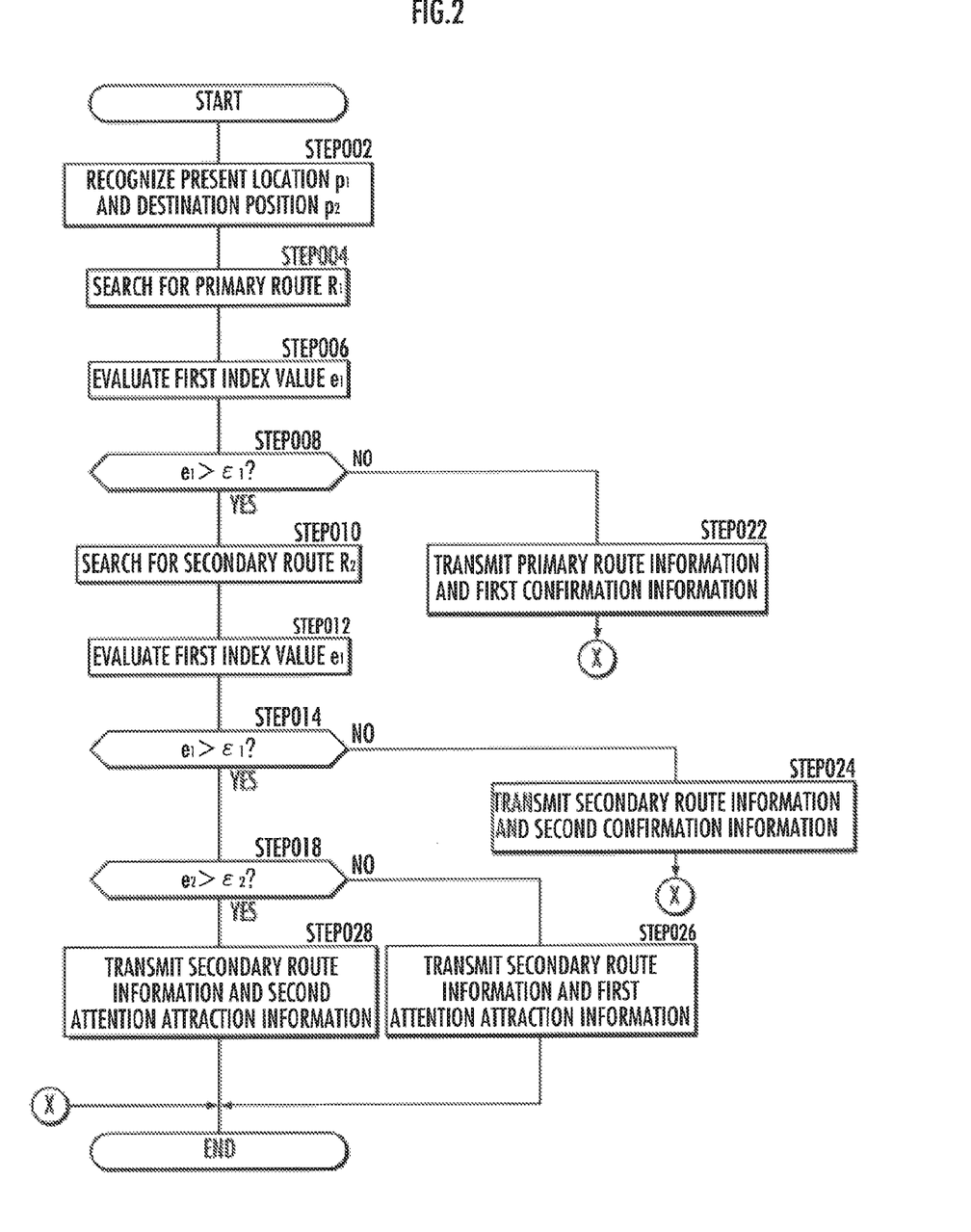
FIG. 2 is a diagram illustrating the functions of a navigation server and a navigation system according to an embodiment of the present invention.

In the navigation server 100, the first server arithmetic processing element 110 receives the designated point information and recognizes the present location $p_1$ and the destination point $p_2$ on the basis of the designated point information (FIG. 2/STEP002). The first server arithmetic processing element 110 searches for one route with the minimum first cost among the routes which are formed by a sequence of a plurality of links connecting the present point $p_1$ and the destination point $p_2$ as a primary route $R_1$ (FIG. 2/STEP004).

Figure 3A:
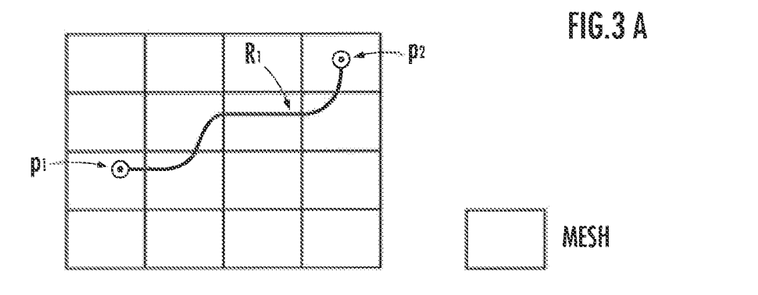
FIG. 3A, FIG. 3B, FIG. 3C, FIG. 3D are diagrams illustrating a route search method of a server.
Figure 3B:
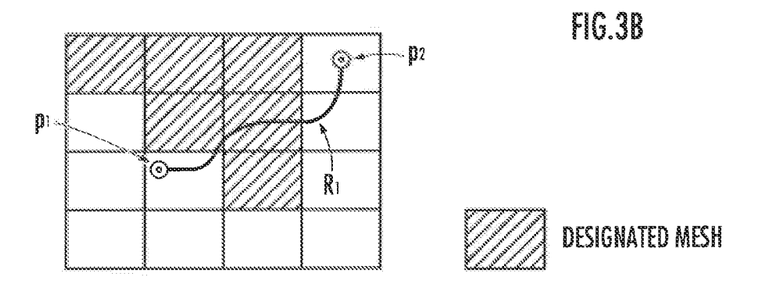

In this way, for example, the primary route $R_1$ shown in FIG. 3A is searched. Moreover, as shown in FIG. 3B, the primary route $R_1$ which overlaps the designated mesh (hatched mesh) is searched.

The second server arithmetic processing element 120 evaluates a first index value $e_1$ indicating the degree of influence of the primary event on the passage of the vehicle along the primary route $R_1$ (FIG. 2/STEP006). For example, the magnitude of the first index value $e_1$ is evaluated on the basis of the length of the distance of a portion of the primary route $R_1$ which overlaps the designated mesh. Among the coordinate value groups indicating the arrangement aspect of the primary route $R_1$, the number of coordinate value groups n included in a designated area A or an increasing function (for example, $e_1 = \delta \times n$) thereof is evaluated as the first index value $e_1$.

The second server arithmetic processing element 120 determines whether the first index value $e_1$ is greater than a first threshold value $\epsilon_1$ (FIG. 2/STEP008). The first threshold value $\epsilon_1$ is defined as a value that is equal to or greater than 0. For example, when the first threshold value $\epsilon_1$ is "0", the primary route $R_1$ shown in FIG. 3A does not overlap the designated mesh and the first index value $e_1$ corresponding to the length of the overlap portion is 0. Therefore, it is determined that the first index value $e_1$ is equal to or less than the first threshold value $\epsilon_1$. In contrast, since the primary route $R_1$ shown in FIG. 3B overlaps the designated mesh, the first index value $e_1$ corresponding to the length of the overlap portion is a positive value and it is determined that the first index value $e_1$ is greater than the first threshold value $\epsilon_1$.

When it is determined that the first index value $e_1$ is equal to or less than the first threshold value $\epsilon_1$ (FIG. 2/STEP008—NO), the second server arithmetic processing element 120 transmits, to the navigation client 200, "primary route information" indicating the arrangement aspect of the primary route $R_1$ and "first confirmation information" indicating that the primary route $R_1$ is a route with low possibility that the passage of the vehicle is affected by the primary event (FIG. 2/STEP022). At that time, information indicating the first cost of the primary route $R_1$ and the first confirmation information are transmitted to the navigation client 200.

In the navigation client 200, the second client arithmetic processing element 220 receives the primary route information and the first confirmation information. The second client arithmetic processing element 220 reproduces the primary route $R_1$ on the basis of the primary route information and displays the route as a result of reproduction on the output device 202 so as to overlap the client map. The reproduced primary route $R_1$ may be mostly the same as (similar or close to) the original primary route $R_1$ and does not need to be entirely the same as the original primary route $R_1$.

For example, a plurality of points indicated by the coordinate value group included in the primary route information, are connected to reproduce the primary route $R_1$. When it is confirmed that the same link identifier is allocated to the common link in the server map and the client map, the link identifiers for identifying some or all of the links forming the primary route $R_1$ are included in the primary route information and a route including all of the links identified by the link identifiers may be reproduced as the primary route $R_1$.

The second client arithmetic processing element 220 makes the output device 202 to output, a message indicating that the primary route $R_1$ has high safety with respect to the primary event, on the basis of the first confirmation information. The first cost of the primary route $R_1$ (or some or all of the costs which are an evaluation basis therefor (for example, the travel distance, the time required for movement, a toll, and fuel consumption)) is output through the output device 202.

Figure 4:
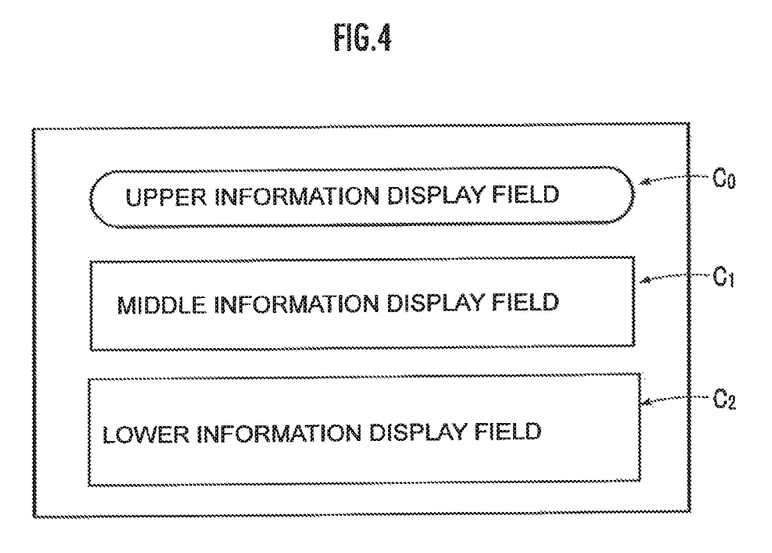
FIG. 4 is a diagram illustrating display information in a navigation client.

In this way, for example, a simple figure including three information display fields $C_0$ to $C_2$ shown in FIG. 4 is displayed on the output device 202. The message is displayed in the upper information display field $C_0$. The message may be output as a voice. The first cost of the primary route $R_1$ is displayed in the middle information display field $C_1$. The second cost of the secondary route $R_2$ is displayed in the lower information display field $C_2$, which will be described below. When the secondary route $R_2$ is not searched, the second cost is not displayed.

When the second server arithmetic processing element 120 determines that the first index value $e_1$ is greater than the first threshold value $\epsilon_1$ (FIG. 2/STEP008—YES), the first server arithmetic processing element 110 searches for a route with the minimum second cost among the routes formed by a sequence of a plurality of links connecting the present location $p_1$ of the vehicle and the destination point $p_2$ as the secondary route $R_2$ (FIG. 2/STEP010).

After the designated point information is transmitted from the navigation client 200 to the navigation server 100, present location information indicating the present location $p_1$ of the vehicle may be periodically transmitted from the navigation client 200 to the navigation server 100. In addition, the latest present location $p_1$ which is different from the present location $p_1$ used to search the primary route $R_1$ may be used to search for the secondary route $R_2$.

Figure 3C:
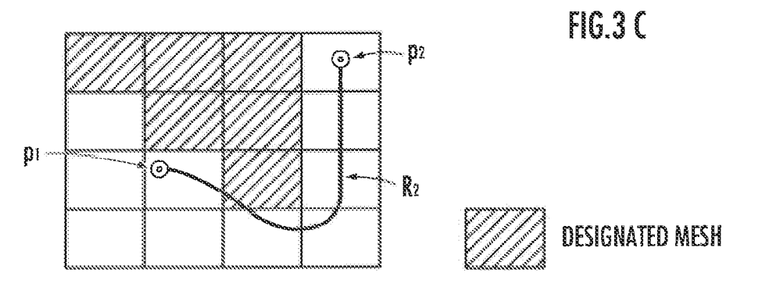

In this way, for example, as shown in FIG. 3C, a route which partially overlaps the designated mesh and in which the distance of the overlap portion is shorter than that in the primary route $R_1$ is searched as the secondary route $R_2$. The reason is that the second cost of a link forming the portion of the primary route $R_1$ which overlaps the designated mesh is evaluated higher than the first cost by the contribution of the event cost and the total second cost of the primary route $R_1$ (previous searched route) is evaluated high.

When the event cost of the designated mesh further increases, a route which completely detours the designated mesh (which does not have an overlap portion) may be searched as the secondary route $R_2$ for the same reason as described above, as shown in FIG. 3D. When the second cost of the link belonging to the designated mesh is higher than the first cost, but the event cost is low, a re-searched route which is the same as the primary route $R_1$ shown in FIG. 3B may be searched as the secondary route $R_2$.

The second server arithmetic processing element 120 evaluates the first index value $e_1$ for the secondary route $R_2$ (FIG. 2/STEP012).

The second server arithmetic processing element 120 determines whether the first index value $e_1$ is greater than the first threshold value $\epsilon_1$ (FIG. 2/STEP014). For example, since the secondary route $R_2$ shown in FIG. 3C overlaps the designated mesh, the first index value $e_1$ corresponding to the length of the overlap portion is a positive value. When the first threshold value $\epsilon_1$ is "0", it is determined that the first index value $e_1$ is greater than the first threshold value $\epsilon_1$. In contrast, since the secondary route $R_2$ shown in FIG. 3D deviates from the designated mesh, the first index value $e_1$ corresponding to the length of the overlap portion is 0. When the first threshold value $\epsilon_1$ is "0", it is determined that the first index value $e_1$ is equal to or less than the first threshold value $\epsilon_1$.

The first threshold value $\epsilon_1$ (see FIG. 2/STEP008) which is contrasted with the first index value $e_1$ of the primary route $R_1$ (previous searched route) may be different from the first threshold value $\epsilon_1$ (see FIG. 2/STEP014) which is contrasted with the first index value $e_1$ of the secondary route $R_2$ (re-searched route). For example, the latter may be a value less than the former.

When it is determined that the first index value $e_1$ is equal to or less than the first threshold value $\epsilon_1$ (FIG. 2/STEP014—NO), the second server arithmetic processing element 120 transmits, to the navigation client 200, "secondary route information" indicating the arrangement aspect of the secondary route $R_2$ and "second confirmation information" indicating that the passage of the vehicle along the secondary route $R_2$ is less likely to be affected by the primary event (FIG. 2/STEP024). At that time, information indicating the first cost of the primary route $R_1$ and the second cost of the secondary route $R_2$ and the second confirmation information are transmitted to the navigation client 200.

The second server arithmetic processing element 120 searches for an example of the secondary event which is associated with the primary event indicated by the primary event information, or the primary event and the area (a mesh which overlaps the primary route $R_1$ among the designated meshes) or the road (a link forming a portion of the primary route $R_1$ which overlaps the designated mesh) among the secondary event information stored in the server database 104 from the server database 104. Then, the example of the secondary event which is caused by the occurrence of the primary event, and the second confirmation information are transmitted to the navigation client 200.

In the navigation client 200, the second client arithmetic processing element 220 receives the secondary route information and the second confirmation information. The second client arithmetic processing element 220 reproduces the secondary route $R_2$ on the basis of the secondary route information and displays the reproduced secondary route $R_2$ on the output device 202 so as to overlap the client map. The secondary route $R_2$ is reproduced by the same method as the primary route $R_1$.

The second client arithmetic processing element 220 makes the output device 202 to output the second confirmation information. Then, for example, a message indicating that although the primary event has occurred, the passage of the vehicle along the secondary route $R_2$ is less likely to be affected by the primary event (the vehicle can detour the designated mesh) is displayed in the upper information display field $C_0$ of the simple figure shown in FIG. 4. The first cost of the primary route $R_1$ is displayed in the middle information display field $C_1$. The second cost of the secondary route $R_2$ is displayed in the lower information display field $C_2$. A deviation or variation amount in the first and second costs may be displayed in the existing field or another field.

The secondary event information is output through the output device 202. When the example of the secondary event is stored so as to be associated with the mesh or the link, the example of the secondary event which results from the same primary event which occurred in the past in the link forming the secondary route $R_2$, which is the re-searched route, or the mesh including the link is output. When the secondary event is not associated with the link and the mesh, the example of the secondary event which results from the same primary event in a link or a mesh that is different from the link forming the secondary route $R_2$ and the mesh including the link is output.

Figure 5:
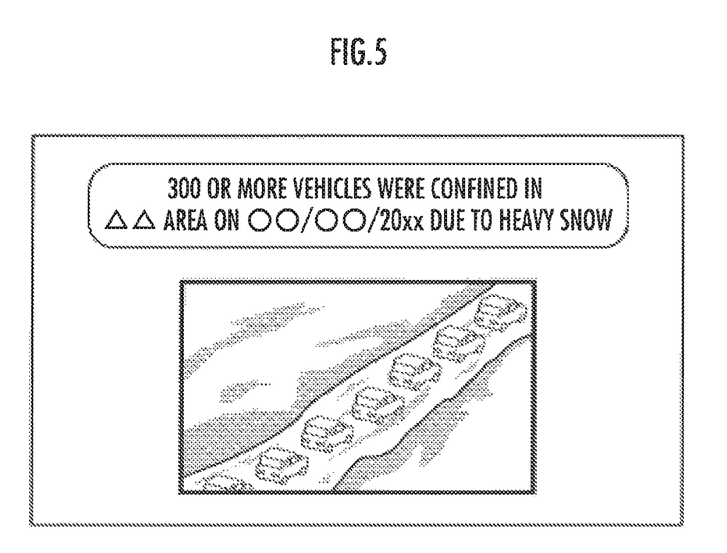
FIG. 5 is a diagram illustrating the display of an example of a secondary event in the navigation client.

For example, as shown in FIG. 5, a character string indicating the content of the example of the secondary event and the actual image or a predetermined illustration image indicating the aspect of the example are displayed on the output device 202.

When determining that the first index value $e_1$ is greater than the first threshold value $\epsilon_1$ (FIG. 2/STEP014—YES), the second server arithmetic processing element 120 further determines whether a second index value $e_2$ indicating the degree of influence of the primary event on the passage of the vehicle at the present location $p_1$ of the vehicle is greater than a second threshold value $\epsilon_2$ (FIG. 2/STEP018). For example, the second index value $e_2$ may be defined as "1" when the present location $p_1$ is included in the designated mesh and may be defined as "0" when the present location $p_1$ is out of the designated mesh. When the present location $p_1$ is out of the designated mesh, the second index value $e_2$ may be defined such that the magnitude thereof is determined by the length of the shortest distance between the present location $p_1$ and the designated mesh.

Figure 3D:
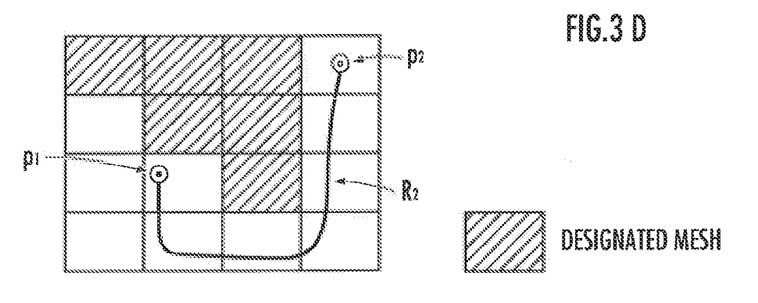

For example, in the state shown in FIGS. 3C and 3D, since the present location $p_1$ is out of the designated mesh, the second index value $e_2$ is "0". When the second threshold value $\epsilon_2$ is "0", it is determined that the second index value $e_2$ is equal to or less than the second threshold value $\epsilon_2$.

When determining that the second index value $e_2$ is equal to or less than the second threshold value $\epsilon_2$ (FIG. 2/STEP018—NO), the second server arithmetic processing element 120 transmits "secondary route information" and "first attention attraction information" indicating that the primary event will have an effect on the passage in the future to the navigation client 200 (FIG. 2/STEP026).

In the navigation client 200, the second client arithmetic processing element 220 receives the secondary route information and the first attention attraction information. The second client arithmetic processing element 220 reproduces the secondary route $R_2$ on the basis of the secondary route information and displays the reproduced secondary route $R_2$ on the output device 202 so as to overlap the client map.

In addition, the second client arithmetic processing element 220 displays the first attention attraction information on the output device 202. Then, for example, a message indicating that the primary event occurs and the vehicle enters the area in which the primary event occurs (designated mesh) when traveling along the secondary route $R_2$ (the primary event is likely to have an effect on the passage of the vehicle in the future) is displayed in the upper information display field $C_0$ of the simple figure shown in FIG. 4. The message may include the distance between the present location $p_1$ of the vehicle and the position where the vehicle is scheduled to enter the designated mesh or the travel distance in the designated mesh. The first cost of the primary route $R_1$ is displayed in the middle information display field $C_1$. The second cost of the secondary route $R_2$ is displayed in the lower information display field $C_2$.

When determining that the second index value $e_2$ is greater than the second threshold value $\epsilon_2$ (FIG. 2/STEP018—YES), the second server arithmetic processing element 120 transmits the "secondary route information" and "second attention attraction information" indicating that the primary event has an effect on the current passage of the vehicle to the navigation client 200 (FIG. 2/STEP028).

In the navigation client 200, the second client arithmetic processing element 220 receives the secondary route information and the second attention attraction information. The second client arithmetic processing element 220 reproduces the secondary route $R_2$ on the basis of the secondary route information and displays the reproduced secondary route $R_2$ on the output device 202 so as to overlap the client map.

In addition, the second client arithmetic processing element 220 displays the second attention attraction information on the output device 202. Then, for example, a message indicating that the present location $p_1$ is included in the area (designated mesh) in which the primary event occurs (the primary event has an effect on the current passage) is displayed in the upper information display field $C_0$ of the simple figure shown in FIG. 4. The message may include the travel distance in the designated mesh. The first cost of the primary route $R_1$ is displayed in the middle information display field $C_1$. The second cost of the secondary route $R_2$ is displayed in the lower information display field $C_2$.

Information which is transmitted from the navigation server 100 to the navigation client 200 may include image information and/or voice information. The second client arithmetic processing element 220 may receive the information and then output the image information and/or the voice information included in the received information to the output device 202. In addition, a flag may be included in transmission information and the second client arithmetic processing element 220 may receive the information, and then read image information and/or voice information designated by the flag in the received information from the client database 204, and output the read information to the output device 202.

According to the navigation server of the invention, it is possible to inform the user of the navigation client 200 of the primary route $R_1$ or the secondary route $R_2$ as the latest search route and that that the possibility that the passage of the vehicle along the primary route $R_1$ or the secondary route $R_2$ is affected by a predetermined primary event, is low (see STEP022 and STEP024 in FIG. 2 and FIG. 4). In addition, since the example of the secondary event is output through the navigation client 200, it is possible to inform the user of the navigation client 200 that the secondary route $R_2$, which is the re-searched route, is searched for in order to avoid the secondary route $R_2$ from being involved in the example of the secondary event (see FIG. 2/STEP 024 and FIG. 5).

The invention claimed is:

1. A navigation server that is configured to support a guidance of a user by a navigation client based on communication with the navigation client, comprising:
   a first server arithmetic processing element and a second server arithmetic processing element that are configured of a programmable computer,
   wherein the first server arithmetic processing element is configured to search for a route connecting a present location of the user and a destination point,
   the second server arithmetic processing element is configured to determine whether or not a first index value indicating a degree of influence of a predetermined primary event on a passage of the user along a searched route is greater than a first threshold value,
   in a case the second server arithmetic processing element determines that the first index value of a previous searched route is greater than the first threshold value, the first server arithmetic processing element re-searches a route such that the first index value is reduced, and in a case it is determined that the first index value of the searched route is equal to or less than the first threshold value, the second server arithmetic processing element transmits the searched route and confirmation information indicating that the first index value is equal to or less than the first threshold value to the navigation client to be output on an output device of the navigation client to notify the user, based on the communication with the navigation client.

2. The navigation server according to claim 1, wherein the second server arithmetic processing element is configured to transmit to the navigation client, an example of a secondary event which is caused by an occurrence of the primary event and a route which is re-searched such that the first index value is equal to or less than the first threshold value, based on the communication with the navigation client.

3. The navigation server according to claim 1, wherein the second server arithmetic processing element is configured to transmit to the navigation client, costs of the previous searched route and a re-searched route or a deviation of the costs and the route which is re-searched such that the first index value is equal to or less than the first threshold value, based on the communication with the navigation client.

4. A navigation server that is configured to support a guidance of a user by a navigation client based on communication with the navigation client, comprising:

a first server arithmetic processing element and a second server arithmetic processing element that are configured of a programmable computer, wherein the first server arithmetic processing element is configured to search for a route connecting a present location of the user and a destination point, the second server arithmetic processing element is configured to determine whether or not a first index value indicating a degree of influence of a predetermined primary event on a passage of the user along a searched route is greater than a first threshold value, in a case the second server arithmetic processing element determines that the first index value of a previous searched route is greater than the first threshold value, the first server arithmetic processing element re-searches a route such that the first index value is reduced, in a case it is determined that the first index value of the searched route is equal to or less than the first threshold value, the second server arithmetic processing element transmits the searched route and confirmation information indicating that the first index value is equal to or less than the first threshold value to the navigation client, based on the communication with the navigation client, in a case the second server arithmetic processing element determines that the first index value of a re-searched route is greater than the first threshold value, the second server arithmetic processing element further determines whether or not a second index value indicating a degree of influence of the primary event on a current passage of the user at the present location is greater than a second threshold value, in a case it is determined that the second index value is equal to or less than the second threshold value, the second server arithmetic processing element makes the navigation client recognize the re-searched route and first attention attraction information indicating that there is a possibility that the passage of the user is affected by the primary event in the future, based on the communication with the navigation client, and in a case it is determined that the second index value is greater than the second threshold value, the second server arithmetic processing element transmits, to the navigation client, the re-searched route and second attention attraction information indicating that the current passage of the user is affected by the primary event, based on the communication with the navigation client.

5. A navigation system comprising:

a navigation server that is configured to support a guidance of a user by a navigation client based on communication with the navigation client; and the navigation client, wherein the navigation server includes a first server arithmetic processing element and a second server arithmetic processing element that are configured of a programmable computer, the first server arithmetic processing element is configured to search for a route connecting a present location of the user and a destination point, the second server arithmetic processing element is configured to determine whether or not a first index value indicating a degree of influence of a predetermined primary event on a passage of the user along a searched route is greater than a first threshold value, in a case the second server arithmetic processing element determines that the first index value of a previous searched route is greater than the first threshold value, the first server arithmetic processing element re-searches a route such that the first index value is reduced, and in a case it is determined that the first index value of a latest searched route is equal to or less than the first threshold value, the second server arithmetic processing element transmits the latest searched route and confirmation information indicating that the first index value is equal to or less than the first threshold value to the navigation client to be output on an output device of the navigation client to notify the user, based on the communication with the navigation client.

* * * * *